United States Patent [19]

Murase

[11] Patent Number: 4,600,139

[45] Date of Patent: Jul. 15, 1986

[54] METHOD OF MAKING CORROSION-RESISTANT END PLATE OF CLADDING TYPE FOR HIGH PRESSURE VESSEL

[75] Inventor: Noriyoshi Murase, Akashi, Japan

[73] Assignee: Kabushiki Kaisha Kobe Seiko Sho, Kobe, Japan

[21] Appl. No.: 523,437

[22] Filed: Aug. 16, 1983

[51] Int. Cl.⁴ .................... B23K 31/02; F16J 12/00
[52] U.S. Cl. ................... 228/184; 228/189; 220/3
[58] Field of Search ............ 228/184, 189; 220/3; 428/636, 603, 594, 595, 599

[56] References Cited

U.S. PATENT DOCUMENTS

| | | | |
|---|---|---|---|
| 1,680,276 | 8/1928 | Andrus et al. | 228/184 |
| 1,975,071 | 10/1934 | Black | 220/3 |
| 2,054,939 | 9/1936 | Larson | 219/10 |
| 2,111,791 | 3/1938 | Larson | 228/184 |
| 2,158,799 | 5/1939 | Larson | 228/184 |
| 2,209,290 | 7/1940 | Watts | 228/63 |
| 2,365,696 | 12/1944 | Grubb | 228/184 |
| 2,366,617 | 1/1945 | Harris | 220/3 |
| 2,585,237 | 2/1952 | Gay | 228/184 |
| 3,052,021 | 9/1962 | Needham | 29/471.1 |
| 3,311,971 | 4/1967 | Hicks et al. | 228/184 |
| 3,365,786 | 1/1968 | Takemora et al. | 220/3 |
| 3,423,820 | 1/1969 | Pechacek et al. | 228/184 |
| 3,596,793 | 8/1971 | Kocher | 220/63 R |
| 3,733,686 | 5/1973 | Maucher | 29/472.1 |
| 3,945,236 | 3/1976 | Hooper | 220/3 |
| 4,073,427 | 2/1978 | Keifert | 228/165 |
| 4,095,734 | 6/1978 | Persson | 228/184 |
| 4,252,244 | 2/1981 | Christian et al. | 220/3 |

Primary Examiner—L. Dewayne Rutledge
Assistant Examiner—John J. Zimmerman
Attorney, Agent, or Firm—Oblon, Fisher, Spivak, McClelland & Maier

[57] ABSTRACT

A corrosion-resistant end plate of cladding type for high pressure vessels such as a urea synthesizing tower and ethanol synthesizing equipment includes a cladding member having a curved external surface complementary to the curved internal surface of a cup-shaped solid pressure-resistant member of a suitable thickness for internal pressure. The cladding member is welded as a plurality of divided segments within the cap-shaped solid pressure-resistant member. With the above arrangement, an expensive corrosion-resistant material need not be used as the pressure-resistant member.

2 Claims, 13 Drawing Figures

F I G. 1 _PRIOR ART_
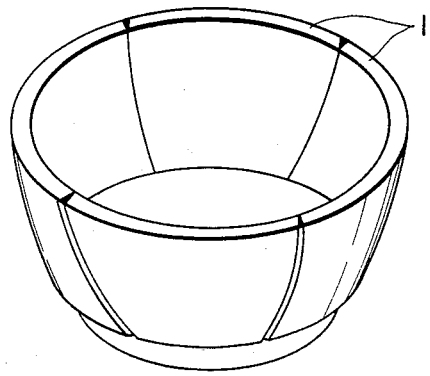
F I G. 2 _PRIOR ART_
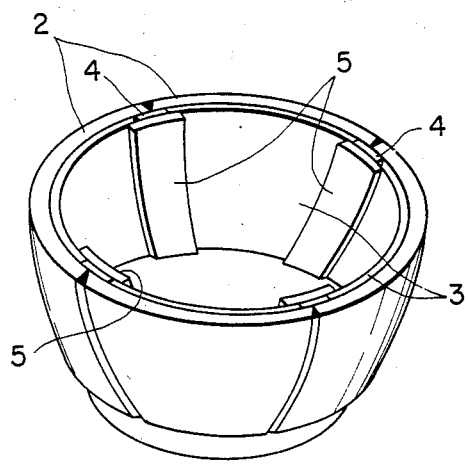

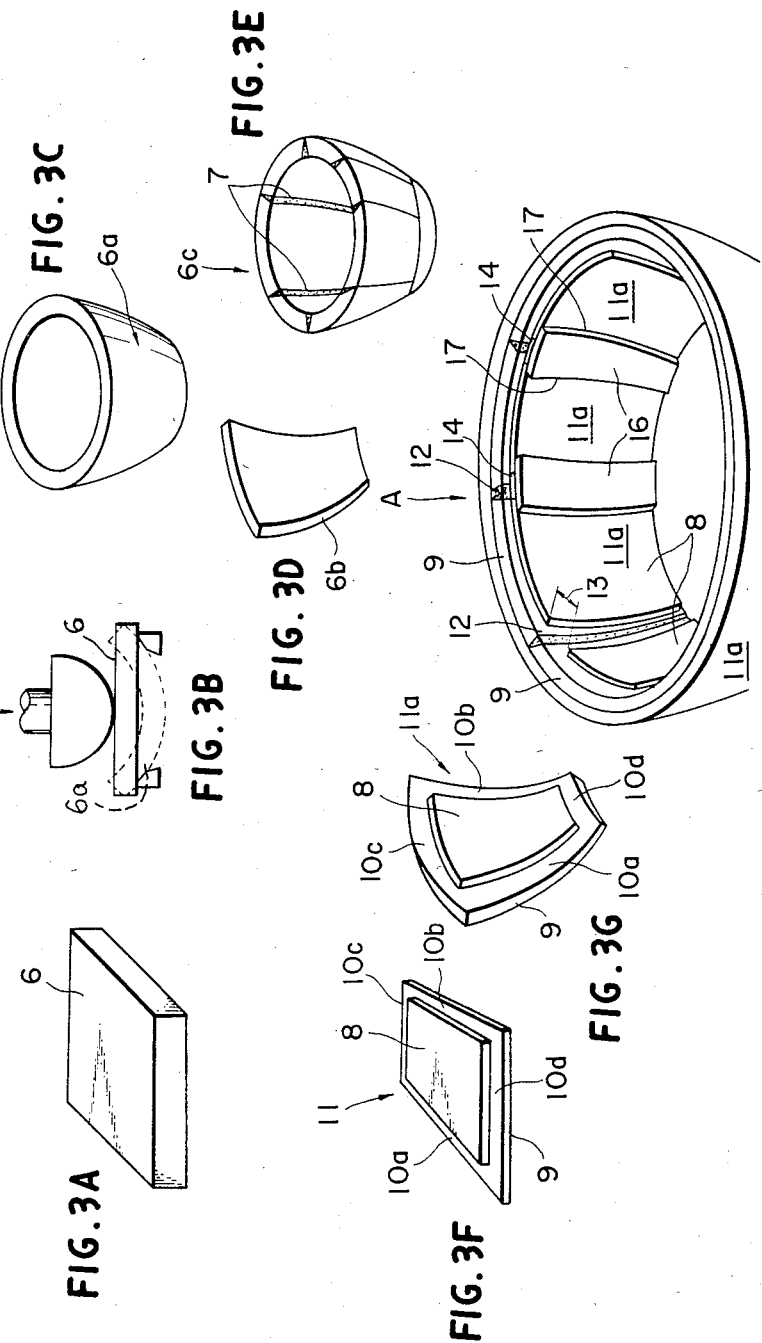

FIG. 4
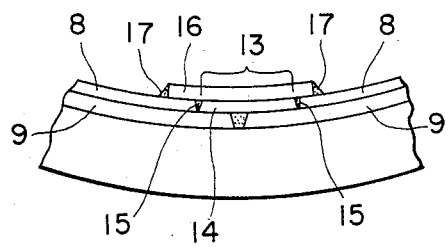
FIG. 6
FIG. 5
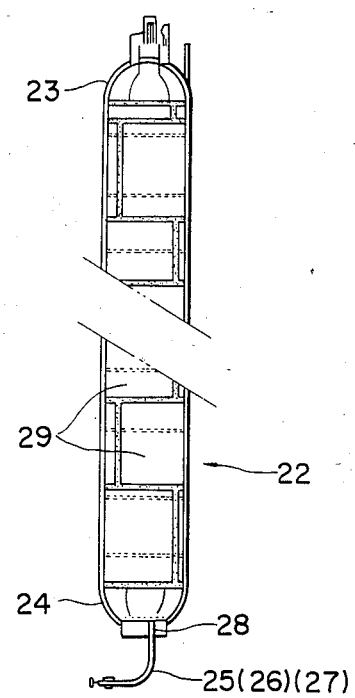
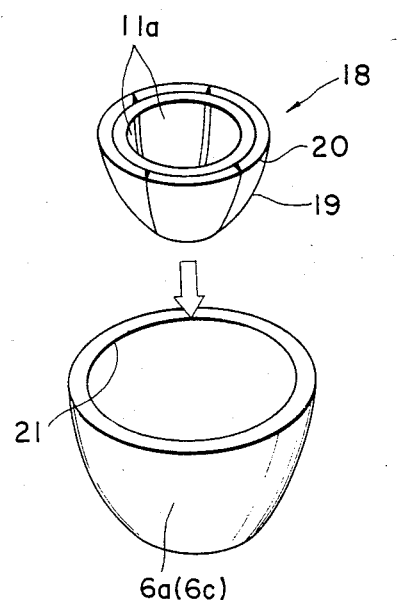

METHOD OF MAKING CORROSION-RESISTANT END PLATE OF CLADDING TYPE FOR HIGH PRESSURE VESSEL

BACKGROUND OF THE INVENTION

This invention relates to a corrosion-resistant clad end plate for a pressure vessel subject to high pressure, and more particularly to an end plate which is high in corrosion resistance, is highly stable and is clear of the possibility of thickness reduction and peeling of clad members.

Generally speaking, in the case of a urea synthesizing tower, ethanol synthesizing equipment or the like which is subject to high pressure, the corrosion of end plate portions of a spherical shell at its top and bottom ends is serious, and loose lining and other techniques are not applicable. During operation, a gap develops between the pressure-resistant member forming an outer shell and the inner corrosion-resistant lining so that the lining is elongated by internal pressure to the extent corresponding to the gap, and a large stress is thus generated in the lining. This occurs, because the internal temperature of the vessel is high and the coefficient of thermal expansion of the liner of titanium or the like is smaller than that of the pressure-resistant member.

Furthermore, since the liner is cooled quickly whereas the pressure-resistant member is cooled slowly during shutdown, the gap between them becomes larger so that the internal pressure is exerted mainly on the liner and, hence, the stress on the liner becomes quite high. Loose lining is thus difficult to use from the viewpoint of strength.

One way to secure adequate corrosion resistance for the end plates of a pressure-resistant vessel is to join corrosion-resistant members (1) of a thickness suitable for withstanding internal pressure to form an end plate by one-piece molding or welding as seen in FIG. 1. An alternative way is to clad corrosion-resistant cladding members (3) to pressure-resistant base members (2) of a suitable thickness for withstanding internal pressure, cut off the cladding members (3) by a predetermined spacing at each of joints, insert dead members (4) into the spaces left by the cut-off portions and cover the dead members with patches (5) welded to the cladding members (3), thus completely covering the interior of the vessel with corrosion-resistant material. The former of the above two measures is uneconomical because of the use of thick plates of expensive corrosion-resistant material. For the latter, the plate-like cladding members should be shaped into a spherical shell by hot pressing, and annealing should be carried out on the welded portions of the cladding base members to remove welding stresses if this was not done not only would the cladding members thermally deteriorate and lose corrosion resistance during hot forming but the adhesive strength of the clads would decline, resulting in peeling or thickness reduction of the cladding members.

SUMMARY OF THE INVENTION

Accordingly, it is an object of the present invention to overcome the problems inherent in the conventional corrosion-resistant structure of high pressure vessels as discussed above. The gist of the present invention lies in a corrosion-resistant end plate of cladding type for a high pressure vessel wherein a cladding member having a curved external surface complementary to the curved internal surface of a cup-shaped solid pressure-resistant member is welded in a plurality of divided segments within the cup-shaped solid pressure-resistant member.

BRIEF DESCRIPTION OF THE DRAWING

The foregoing and other objects, features and advantages of the present invention will be better understood from the following description taken with reference to the accompanying drawings, wherein:

FIGS. 1 and 2 are perspective views of conventional pressure-resistant and corrosion-resistant end plates, wherein FIG. 1 illustrates the end plate made of a solid, thick corrosion-resistant material and FIG. 2 illustrates the whole of the end plate built by clad base members of thick pressure-resistant material;

FIG. 3A through FIG. 3H illustrate the steps of manufacturing an end plate according to an embodiment of the present invention;

FIG. 4 is an enlarged top view of portion A in FIG. 3H;

FIG. 5 is a perspective view illustrating an alternative manufacturing step; and FIG. 6 is a side view of a urea synthesizing tower using the end plate according to the present invention.

DETAILED DESCRIPTION OF THE INVENTION

Referring to FIGS. 3A through 3H; and following drawings, the present invention will be particularly described in terms of its embodiments.

The end plate embodying the present invention comprises a pressure-resistant member forming an outer shell of the end plate and a corrosion-resistant cladding member for imparting an increased corrosion resistance, said cladding member being fixedly secured to the inner surface of the pressure-resistant member by welding.

As shown in FIGS. 3A through 3H, the pressure-resistant member is set up by hot forming a steel plate (6) (see FIG. 3A) into a bowl-shaped end plate (6a) (FIG. 3C) with a press machine 100 (FIG. 3B). In the case of a vessel which is too large in diameter to be set up by forming a single steel plate, a plurality of end plate segments (6b) (FIG. 3D) each forming part of the spherical shell, are performed and end portions thereof are welded to set up a solid pressure-resistant member (6c) (FIG. 3E). Thereafter, a cladding member is welded to the resulting cup-shaped solid pressure-resistant member (6a) or (6c). Two methods of securing such cladding member are available.

The first method consists of laminating a corrosion-resistant member (8) of titanium and zirconium to each of comparatively thin clad base members (9) (FIG. 3F), cutting off side portions (10a), (10b), (10c) and (10d) of the member 8 to expose the clad base member at those portions, cold forming the resulting corrosion-resistant cladding member (11) into a petal-shaped segment (11a) (FIG. 3G) positioning the respective segments (11a) edge-to-edge (FIG. 3H) within, and in conformity with, the curved internal surface of the pressure-resistant member (6a) or (6c) and welding the clad base members together and the clad base members to the pressure-resistant members at the abutting positions (12) of the base members 9. Since the respective segments (11a) need to be welded to the curved internal surfaces of the pressure-resistant members (6c) with tight fitting under these circumstances, the curved external surfaces of the respective segments and the curved internal surfaces of the pressure-resistant members are machined to give the same radius of curvature. After the respective cap-shaped segments (11a) have been welded onto the curved internal surface of the pressure-resistant member (6a) or (6c), dead plates (14) of the same material as the cladding members are inserted into the spaces of the cutout portions (13) of the cladding members at the joints of the respective cladding members and then secured to the cladding members (8) by tack welding (15) as seen in FIG. 4. The thickness of this tack welding (15) is selected to be about half the thickness of the corrosion resistant members (8) in order to prevent melting of the base members (9) due to welding heat. After completion of bonding the cladding members, the dead plates (14) and patches (16) are fitted to the internal surfaces of the corrosion resistant members (8) and the patches 16 are bonded by fillet welding (17) to the corrosion resistant members 8 so as to bond the cladding members to one another and to back up the corrosion resistance of the bonding portions. In the foregoing description, the cladding members are disposed on the internal surface of the pressure-resistant member sequentially one by one and eventually bonded together by means of the dead plate and the patches. According to the second method as illustrated in FIG. 5, comparatively thin cladding members are cold-formed and welded into a hemispherical configuration (18) by bonding petal-shaped end plate segments (11a) and the outer periphery (19) thereof is machined to provide a smooth spherical surface. At the same time the internal surface of the solid pressure-resistant member (6a) or (6c) is machined to be complementary to the machined outer periphery 19 of the hemispherical body (18). The hemispherical shaped cladding member (18) is inserted into the pressure-resistant member (6a) or (6c) with its upper edge (20) welded and fixed to the internal surface (21) of the upper end of the solid pressure-resistant member (6a) or (6c). As above, the cladding members are bonded together using the dead plates and the patches together with welding and shaping the semispherical body (18).

The foregoing manufacturing methods both provide the corrosion-resistant end plate of cladding type for high pressure vessels, wherein the cladding member having a curved external surface complementary to the curved internal surface of the cup-shaped solid pressure-resistant member (6a) or (6c) of a suitable thickness for internal pressure is welded in a plurality of divided segments (11a) within the cup-shaped solid pressure-resistant member as taught by the present invention. The resulting end plate is generally used at a head portion of a high pressure vessel in which flows a corrosive fluid or the like, for example, a bottom head portion of a urea synthesizing tower, and top and bottom head portions of ethanol synthesizing equipment. FIG. 6 shows an application of the corrosion-resistant end plate embodying the present invention to top and bottom heads (23) and (24) of a urea synthesizing tower (22). Carbon dioxide, liquid ammonia and unreacted urea liquid injected from three inlet pipes (25), (26) and (27) (only the inlet pipe (25) shown) to the bottom head (24) by way of a nozzle (28) and travel through cylindrical reaction chambers (29) in the reaction tower (22). Urea liquid is delivered via the top head (23).

As noted earlier, the present invention provides a corrosion-resistant cladding type end plate for high pressure vessels, wherein the cladding member having a curved external surface complementary to the curved internal surfaces of the cap-shaped solid pressure-resistant member of a suitable thickness for internal pressure is welded in a plurality of divided segments within the cup-shaped solid pressure-resistant member. The present invention offers an economic advantage because of no need to use an expensive solid corrosion-resistant material as the pressure-resistant member. Only comparatively thin cladding members are necessary because the cladding members themselves are guarded by the pressure-resistant end plate behind the cladding members and need not be pressure-resistant. This implies no requirement for hot molding or other processes and offers many advantages in the prevention of peeling or thickness reduction of the cladding members, no decrease of corrosion resistance and excellent resistance to pressure and corrosion.

While the invention has been particularly shown and described with reference to preferred embodiments thereof, it will be understood by those skilled in the art that various changes may be made without departing from the spirit and scope of the invention.

What is claimed is:

1. A method of forming a corrosion-resistant cladding type end plate for a high pressure vessel, comprising:
    forming a cup-shaped solid pressure resistant vessel having a curved internal surface;
    welding a corrosion-resistant member to each of a plurality of base cladding member segments to form cladding segments, edges of said corrosion resistant members being spaced from edges of said base cladding member segments;
    curving said base cladding segments with a shape corresponding to an internal shape of said pressure-resistant vessel;
    forming said cladding segments into a cladding member welded into said pressure resistant vessel with edges of said base cladding member segments defining joints welded to one another and said corrosion-resistant members spaced from one another at said joints;
    welding dead plates of the same material as said corrosion-resistant members into said spaces by welding to said corrosion-resistant members;
    covering said dead plates with patches; and
    welding said patches to said corrosion-resistant members.

2. The method of claim 1, wherein said step of forming said cladding segments into a cladding member comprises the steps of:
    forming said cladding segments into a hemispherical member by use of said steps of welding said dead plates, covering said dead plates and welding said patches;
    inserting said hemispherical member into said pressure resistant vessel; and
    welding said hemispherical member to said pressure resistant vessel.

* * * * *